US012750247B2

(12) United States Patent
Ueno et al.

(10) Patent No.: US 12,750,247 B2
(45) Date of Patent: Sep. 29, 2026

(54) CONTENT GENERATION APPARATUS THAT REGISTERS INFORMATION IN BLOCKCHAIN, CONTROL METHOD FOR CONTENT GENERATION APPARATUS, AND STORAGE MEDIUM

(71) Applicant: CANON KABUSHIKI KAISHA, Tokyo (JP)

(72) Inventors: Daiyu Ueno, Kanagawa (JP); Keiichiro Kubo, Saitama (JP); Naohiko Tsuchida, Tokyo (JP); Minoru Sakaida, Kanagawa (JP); Atsushi Fujita, Tokyo (JP); Keisuke Tanaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 42 days.

(21) Appl. No.: 18/525,188

(22) Filed: Nov. 30, 2023

(65) Prior Publication Data

US 2024/0106672 A1 Mar. 28, 2024

Related U.S. Application Data

(63) Continuation of application No. PCT/JP2022/022342, filed on Jun. 1, 2022.

(30) Foreign Application Priority Data

Jun. 10, 2021 (JP) ................................. 2021-097427
Apr. 22, 2022 (JP) ................................. 2022-070966

(51) Int. Cl.
*H04L 9/00* (2022.01)
*H04L 9/32* (2006.01)

(52) U.S. Cl.
CPC .............. *H04L 9/50* (2022.05); *H04L 9/3239* (2013.01)

(58) Field of Classification Search
CPC ....... H04L 9/50; H04L 9/3239; H04L 9/3236; H04L 9/32; G06F 21/64; G06F 3/005
See application file for complete search history.

(56) References Cited

U.S. PATENT DOCUMENTS 7,386,603 B2 6/2008 Shiba
8,839,224 B2 * 9/2014 Adler ...................... H04L 67/10 717/178

(Continued)

FOREIGN PATENT DOCUMENTS

CN 112052292 A 12/2020
JP 2005-275807 A 10/2005

(Continued)

OTHER PUBLICATIONS

U.S. Appl. No. 18/521,219, filed Nov. 28, 2023 by Daiyu Ueno.

(Continued)

*Primary Examiner* — Blake I Narramore
(74) *Attorney, Agent, or Firm* — VENABLE LLP

(57) ABSTRACT

A content generation apparatus capable of easily confirming content data, the information of which is registered in a blockchain, is provided. An image pickup apparatus generates an image file and then immediately calculates a hash value of the image file, and transmits image file information including the hash value to a management system. In response to receipt of a registration completion notification indicating that a process of registering the image file information in a blockchain is completed, the image pickup apparatus stores registration-completed information indicating that the image file information is registered in the blockchain, relating to the image file.

11 Claims, 10 Drawing Sheets

(56) References Cited

U.S. PATENT DOCUMENTS

| | | | | |
|---|---|---|---|---|
| 10,341,309 | B1 * | 7/2019 | Ramirez | H04L 63/0435 |
| 10,361,866 | B1 * | 7/2019 | McGregor | H04L 9/0637 |
| 10,565,358 | B1 * | 2/2020 | Bertsch | H04L 63/123 |
| 10,726,533 | B2 * | 7/2020 | McGregor | H04L 9/0637 |
| 11,843,751 | B2 | 12/2023 | Kamekawa | |
| 2014/0210834 | A1 * | 7/2014 | Yamaguchi | G06T 1/20 345/522 |
| 2016/0283920 | A1 * | 9/2016 | Fisher | H04L 9/3239 |
| 2017/0116693 | A1 * | 4/2017 | Rae | G06Q 50/184 |
| 2017/0206523 | A1 | 7/2017 | Goeringer | |
| 2018/0139056 | A1 * | 5/2018 | Imai | H04L 9/14 |
| 2018/0232828 | A1 * | 8/2018 | Joao | G06Q 10/00 |
| 2019/0164140 | A1 * | 5/2019 | Pasupula | G06Q 30/08 |
| 2019/0279173 | A1 * | 9/2019 | Marchetto | H04L 9/3297 |
| 2020/0320679 | A1 | 10/2020 | Mcgregor | |
| 2021/0192059 | A1 * | 6/2021 | Watanabe | H04L 9/0861 |
| 2021/0303401 | A1 * | 9/2021 | Yarimi | G06F 11/2094 |
| 2021/0385231 | A1 * | 12/2021 | Nainar | H04L 9/3247 |
| 2022/0129391 | A1 * | 4/2022 | Shiner | H04W 12/61 |

FOREIGN PATENT DOCUMENTS

| | | | |
|---|---|---|---|
| JP | 2006-121493 | A | 5/2006 |
| JP | 2008-108138 | A | 5/2008 |
| JP | 2009-126033 | A | 6/2009 |
| JP | 2017-204706 | A | 11/2017 |
| JP | 2017-204707 | A | 11/2017 |
| JP | 2021-18514 | A | 2/2021 |
| WO | 2021/014863 | A1 | 1/2021 |

OTHER PUBLICATIONS

U.S. Appl. No. 18/524,411, filed Nov. 30, 2023 by Keisuke Tanaka.

International Search Report issued Dec. 12, 2022 in corresponding PCT Application No. PCT/JP2022/022342 (English translation included).

European Search Report issued Apr. 9, 2025 during prosecution of related European Application No. 22820122.

Korean Office Action issued Jul. 22, 2025, 2025 during prosecution of related Korean Patent Application No. 10-2023-7039748 (English translation included).

Indian Office Action issued Apr. 9, 2025 during prosecution of related Indian Patent Application No. 202347081677 (English translation included).

Japanese Office Action issued Jan. 6, 2026 during prosecution of corresponding Japanese application No. 2022-070966.

Chinese Office Action issued Jun. 26, 2026 during prosecution of corresponding Chinese application No. 202280040993.8 (English-language machine translation included).

Japanese Office Action issued Jun. 30, 2026 during prosecution of corresponding Japanese application No. 2022-070966 (English-language machine translation included).

* cited by examiner

*FIG. 5*

407 501 502 503

| BLOCK ID | AUTHENTICITY GUARANTEE NUMBER | IMAGE FILE NAME |
|---|---|---|
| 0 | 0000000000000000 | IMG_0000.JPG |
| 1 | 5432456667777773 | IMG_0001.JPG |
| 2 | 0988501939374728 | IMG_0002.JPG |
| 3 | 1111220034355050 | IMG_0003.JPG |
| 4 | 3322434456777888 | IMG_0004.JPG |

CONTENT GENERATION APPARATUS THAT REGISTERS INFORMATION IN BLOCKCHAIN, CONTROL METHOD FOR CONTENT GENERATION APPARATUS, AND STORAGE MEDIUM

CROSS-REFERENCE TO RELATED APPLICATIONS

This application is a Continuation of International Patent Application No. PCT/JP2022/022342 filed on Jun. 1, 2022, which claims the benefit of Japanese Patent Application No. 2021-97427 filed on Jun. 10, 2021 and Japanese Patent Application No. 2022-070966 filed on Apr. 22, 2022, all of which are hereby incorporated by reference herein in their entirety.

BACKGROUND OF THE INVENTION

Field of the Invention

The present invention relates to a content generation apparatus that registers information in a blockchain, a control method for the content generation apparatus, and a storage medium.

Background Art

In recent years, information sharing via the Internet or a social networking service (SNS) has become active, which allows anyone to view and transmit information. Under such circumstances, evolution of digital image processing technology makes it difficult for information viewers to confirm the authenticity of what they are viewing, and problems such as fake news have become serious. To address these problems, there is a growing demand for a mechanism capable of guaranteeing the authenticity of digital images, that is, guaranteeing that, for example, no processing or falsification is added to the digital images.

As a mechanism capable of guaranteeing the authenticity of digital images, it is considered to use blockchain technology which is widely used in finance and other industries. Blockchain technology can prevent falsification of digital data in a decentralized manner and at low cost.

For example, a management system using blockchain technology registers, in a blockchain, a hash value of content generated by a content generation apparatus and metadata accompanying the content as content information. Thereby, the authenticity of the content from the time of its generation is guaranteed (for example, refer to PTL 1). This technology makes it possible to acquire, from the management system, content that has not been processed or otherwise tampered with since its generation, and to publish the acquired content on the Internet, the SNS, or the like.

CITATION LIST

Patent Literature

PTL 1: Japanese Laid-Open Patent Publication (kokai) No. 2017-204706

Here, PTL 1 described above refers to the technology of registering the content information in a blockchain. However, this technology has a problem in that it is difficult for a user to confirm content, the information of which is registered in a blockchain.

SUMMARY OF THE INVENTION

The present invention provides a content generation apparatus capable of easily confirming content, the information of which is registered in a blockchain, a control method for the content generation apparatus, and a storage medium.

In order to solve the above-described problems, a content generation apparatus according to the present invention includes a memory storing instructions and at least one processor. The at least one processor executes the instructions to generate content data, calculate a hash value of the content data in response to generating the content data, and transmit content information including the hash value to a management server that registers the content information in a blockchain. The at least one processor further executes the instructions to receive a notification indicating that a process of registering the content information in the blockchain is completed, and store registration-completed information indicating that the content information is registered in the blockchain, relating to the content data in response to receipt of the notification.

Further features of the present invention will become apparent from the following description of exemplary embodiments with reference to the attached drawings.

BRIEF DESCRIPTION OF THE DRAWINGS

FIG. 5 is a diagram illustrating an example of a configuration of an image database in FIG. 4.

DESCRIPTION OF THE EMBODIMENTS

Hereinafter, embodiments of the present invention will be described in detail with reference to the drawings. It should be noted that, in the embodiments, an image pickup apparatus will be described as an example of a content generation apparatus, but the content generation apparatus is not limited to the image pickup apparatus. For example, the content generation apparatus may be another apparatus that generates content, such as an apparatus that generates audio data of recorded audio, an apparatus that generates image data such as an illustration image digitally drawn by a user, or an apparatus that generates data of music composed by a user.

Figure 1:
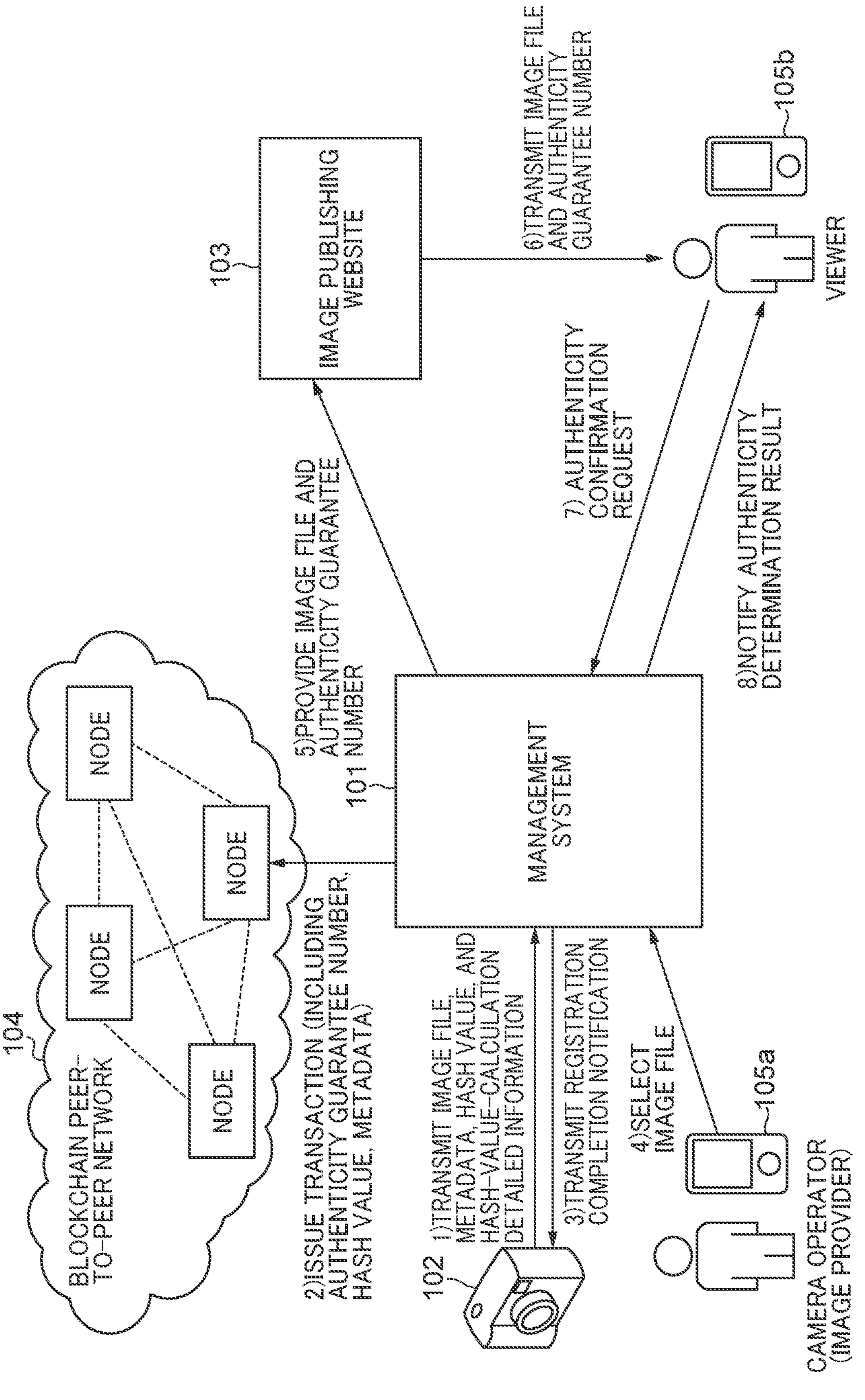
FIG. 1 is a diagram illustrating functions of a management system that communicates with an image pickup apparatus serving as a content generation apparatus according to an embodiment of the present invention.

FIG. 1 is a diagram illustrating functions of a management system 101 that communicates with an image pickup apparatus 102 serving as a content generation apparatus according to the present embodiment.

The management system 101 is a management server having a function of managing content acquired from an external device, such as the image pickup apparatus 102, via the Internet or the like. The management system 101 is implemented by one or more computer devices. It should be noted that, in the present embodiment, a configuration in which the management system 101 further communicates with and uses a blockchain peer-to-peer network 104 will be described, but the present invention is not limited to this configuration, and may be realized using another network.

As illustrated in FIG. 1, upon performing a shooting operation (image capturing of a subject), the image pickup apparatus 102 transmits an image file obtained by the shooting operation, a hash value (an image hash value), and hash-value-calculation detailed information to the management system 101 in association with each other (step (1)). The image file includes image data and metadata. The image data is still image data or video data. The metadata includes attribute information of the image data, indicating camera operator, shooting time, shooting location, model of the image pickup apparatus, setting values at the time of shooting, and the like of the image data. The hash value is a value obtained by executing a hash function on the image file at the time of generation.

The hash-value-calculation detailed information is information in a case where image data included in the image file is thinned out and then the hash function is executed on the image data, describing information indicating the way to thin out the image data. It should be noted that as to an algorithm of the hash function, only a default algorithm may be used, or one of multiple algorithms, such as SHA 256 and MD5, may be selected. In the latter case (a case where one of multiple algorithms is selected), the algorithm used for the hash value calculation is also described in the hash-value-calculation detailed information. For example, in a case where the image data is hashed by the algorithm SHA 256, SHA 256 processes the data 64-bytes to 64-bytes from the head to the end of the data, thereby generating a hash value of 32 bytes (256 bits). If a process in which first 64 bytes from the head of the image data are used for the processing and the next 64 bytes are skipped without being used for the processing, is repeatedly performed for the whole image data, a processing amount will be halved. The hash-value-calculation detailed information in this case can be expressed as, for example, "Algorithm, SHA 256, Read, 64, Skip, 64" in the CSV file format. In another case where the image data is video data, the hash function can be executed every other frame. The hash-value-calculation detailed information in this case can be expressed as, for example, "Algorithm, SHA 256, SkipFrame, 1," in the CSV file format. Further, in combination with this, it is also possible to thin out data within one frame instead of using all the data. The hash-value-calculation detailed information in this case can be expressed as, for example, "Algorithm, SHA 256, SkipFrame, 1, Read, 64, Skip, 64" in the CSV file format.

It should be noted that the format of the hash-value-calculation detailed information is not limited to the CSV file format. For example, a widely used file format, such as the JSON file format, may be used, or a unique file format may be used.

It should be noted that, in the present embodiment, a description will be given as to a configuration in which the image pickup apparatus 102 generates a hash value and transmits the hash value to the management system 101, but the present invention is not limited to this configuration. For example, the management system 101 may generate a hash value based on an image file acquired from the image pickup apparatus 102.

Upon receiving the image file, the hash value, and the hash-value-calculation detailed information from the image pickup apparatus 102, the management system 101 of the present embodiment generates an authenticity guarantee number which is a unique number in the management system 101. The authenticity guarantee number is an identification number for uniquely identifying the image file.

The management system 101 generates transaction data including image file information, such as the metadata, the hash value, and the hash-value-calculation detailed information, and the authenticity guarantee number, and connects a block in which the generated transaction data is written to a blockchain. Specifically, the management system 101 issues the generated transaction data and broadcasts the transaction data to one or more computers (nodes) participating in the blockchain peer-to-peer network 104 (step (2)). As a result, the transaction data is temporarily stored in a transaction pool, and the verification is completed when the transaction data is approved by a miner. Then, a block in which the transaction data is written is generated, and the block is added to the tail of the blockchain. As a result, the image file information is registered in the blockchain.

After connecting the block in which the transaction data is written to the blockchain, the management system 101 stores (provides) the image file and the authenticity guarantee number in association with each other in an image database 407 in FIG. 4 which will be described later. The management system 101 then transmits, to the image pickup apparatus 102, a registration completion notification indicating that the process of registering the image file information in the blockchain is completed (step (3)).

Thereafter, the management system 101 allows a user (for example, a camera operator or an image provider) to select an image file to be published on the image publishing website 103 from among image files registered in the image database 407 (step (4)). Specifically, the user is allowed to access a web page of the management system 101 from a communication device 105*a* operated by the user, and select, on the web page, an image file to be published on the image publishing website 103. The management system 101 provides the image file selected by the user and the authenticity guarantee number associated with the image file to the image publishing website 103 (step (5)). At the same time, the management system 101 notifies the communication device 105*a* that the image file selected by the user in step (4) is now ready for publication on the image publishing website 103.

The image publishing website 103 performs display control such that the authenticity guarantee number provided from the management system 101 together with the image file is displayed, for example, in the vicinity of the image file on the web page. It should be noted that the display position of the authenticity guarantee number is an example, and the authenticity guarantee number may be displayed at any position where a viewer of the image publishing website 103 can recognize that the authenticity guarantee number corresponds to the image file.

There is a case in which a viewer of the image publishing website 103 desires to confirm whether an image file displayed on the web page of the image publishing website 103 has been falsified since the time of shooting (authenticity confirmation). In this case, the viewer first acquires (downloads) the image file and the authenticity guarantee number associated with the image file from the image publishing website 103, using a communication device 105*b* (step (6)). Specifically, the viewer accesses the web page of the image publishing website 103 from the communication device 105*b*, selects the image file published on the web page, and instructs downloading. When this instruction is given, the image publishing website 103 transmits the selected image file and the authenticity guarantee number to the communication device 105*b*.

When the downloading is completed, the communication device 105*b* (first communication device) transmits an authenticity confirmation request for the image file to the management system 101, together with the acquired image file and authenticity guarantee number (step (7)). In the present embodiment, the authenticity confirmation request is made by a viewer using the communication device 105*b* to make an attachment of the image file and the authenticity guarantee number acquired from the image publishing website 103 to an input form provided by the management system 101. However, the authenticity confirmation request is not limited to the method of the present embodiment, and may be performed, for example, by transmitting an e-mail, to which the image file and the authenticity guarantee number are attached, to the management system 101.

When the authenticity confirmation request is transmitted from the communication device 105*b*, the management system 101 determines the authenticity of the image file as a target of the authenticity confirmation request. Here, the time to determine the authenticity is when the management system 101 receives the authenticity confirmation request for the image data displayed on the image publishing website 103, from the communication device 105*b* of the viewer of the image publishing website 103, but the present invention is not limited thereto. For example, the management system 101 may periodically determine the authenticity based on the image database 407. The management system 101 displays an authenticity determination result on the web page of the management system 101 or notifies the communication device 105*b* of the authenticity determination result by e-mail (step (8)).

Figure 2:
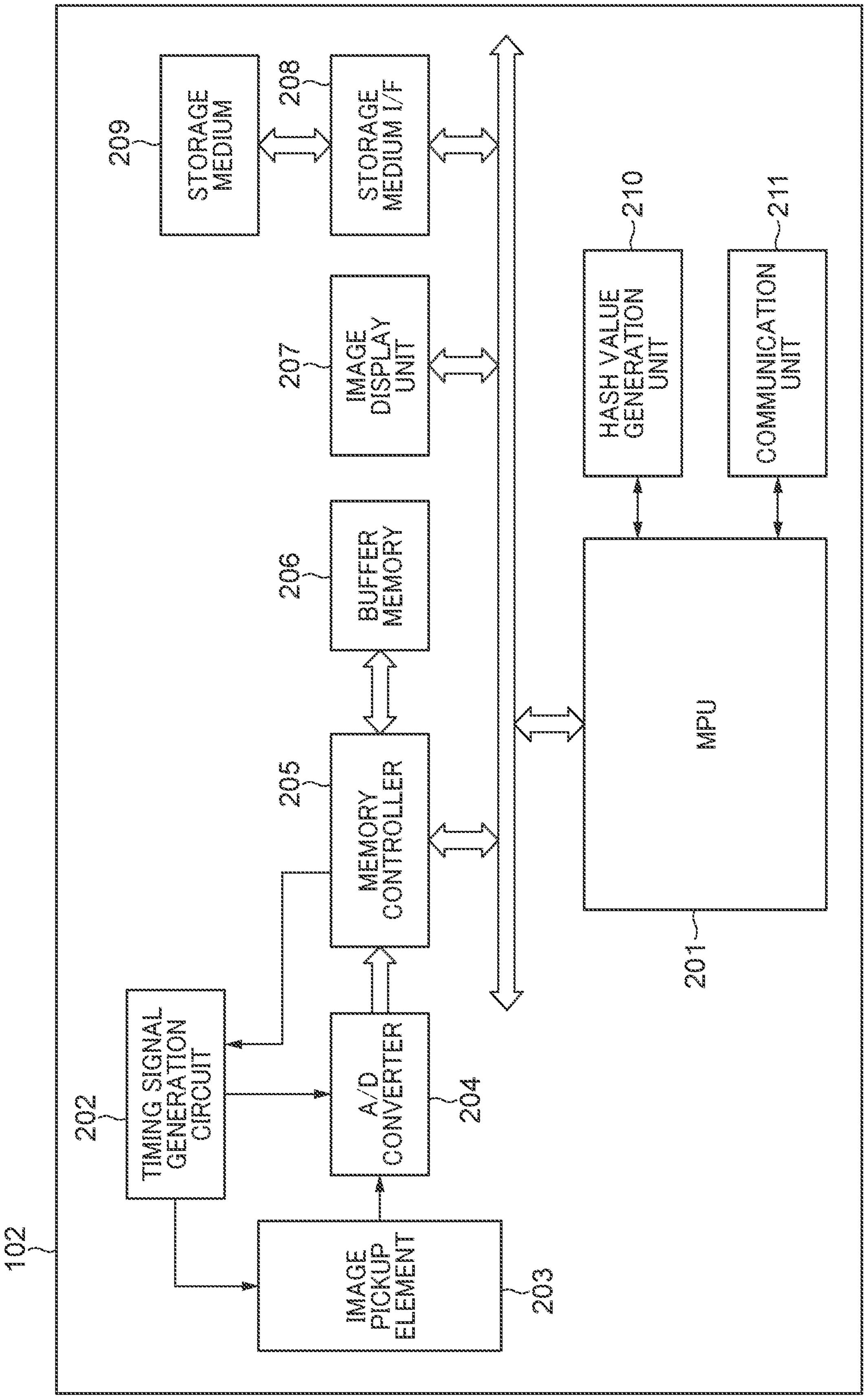
FIG. 2 is a block diagram schematically illustrating a configuration of the image pickup apparatus in FIG. 1.

FIG. 2 is a block diagram schematically illustrating a configuration of the image pickup apparatus 102 in FIG. 1. The image pickup apparatus 102 is a camera, such as a digital camera or a digital video camera, or an electronic device with a camera function, such as a mobile phone having a camera function or a camera-equipped computer.

In FIG. 2, the image pickup apparatus 102 includes an MPU 201, a timing signal generation circuit 202, an image pickup element 203, an A/D converter 204, a memory controller 205, a buffer memory 206, and an image display unit 207. Furthermore, the image pickup apparatus 102 includes a storage medium I/F 208, a storage medium 209, a hash value generation unit 210, and a communication unit 211.

The MPU 201 is a microcontroller for performing control related to a system of the image pickup apparatus 102, such as a shooting sequence.

The timing signal generation circuit 202 generates a timing signal necessary for operating the image pickup element 203.

The image pickup element 203 is an image pickup element such as a CCD or a CMOS that receives light reflected by a subject, converts the received light into an electrical signal (analog image data), and allows the A/D converter 204 to read out the electrical signal.

The A/D converter 204 converts analog image data read from the image pickup element 203 into digital image data. Hereinafter, this digital image data is simply referred to as "image data".

The memory controller 205 controls reading and writing of an image file from and to the buffer memory 206, a refresh operation on the buffer memory 206, and the like. This image file is an image file, in which metadata is attached to image data, generated by the MPU 201 in a manner described later. Details will be described later.

The buffer memory 206 stores image files.

The image display unit 207 displays image files stored in the buffer memory 206.

The storage medium I/F 208 is an interface for controlling reading and writing of data from and to the storage medium 209.

The storage medium 209 is, for example, a storage medium configured to be insertable into and removable from the image pickup apparatus 102, such as a memory card, and stores programs, image files, and the like therein.

The hash value generation unit 210 generates (calculates) a hash value by executing a hash function on an image file stored in the buffer memory 206. It should be noted that the MPU 201 instead of the hash value generation unit 210 may generate the hash value. In addition, the hash value may be generated by executing the hash function on the image data instead of the image file.

The communication unit 211 is connected to the Internet and transmits and receives data to and from an external device.

Figure 3:
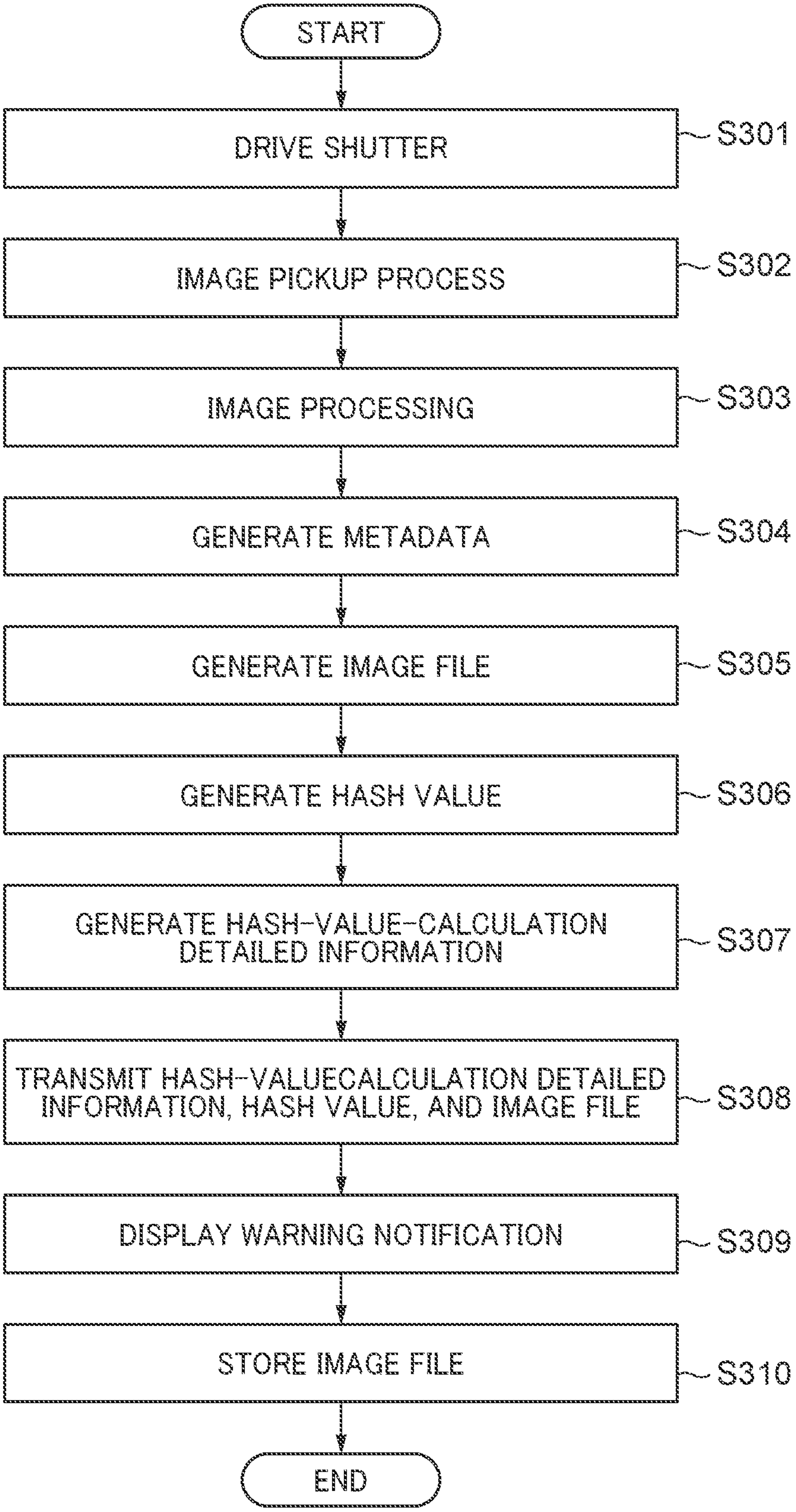
FIG. 3 is a flowchart illustrating the steps of a data transmission process executed in the image pickup apparatus in FIG. 1.

FIG. 3 is a flowchart illustrating the steps of a data transmission process executed in the image pickup apparatus 102 in FIG. 1. The data transmission process in FIG. 3 is implemented by the MPU 201 of the image pickup apparatus 102 executing a program stored in the storage medium 209 or the like. The data transmission process in FIG. 3 is started when the image pickup apparatus 102 receives a shooting start operation such as pressing a shooting button of the image pickup apparatus 102 by a camera operator.

In FIG. 3, the MPU 201 drives a shutter (which is not illustrated) arranged on the subject side of the image pickup element 203 in order to control the exposure time (step S301).

Next, the MPU 201 performs an image pickup process in which the image pickup element 203 converts light from a subject, passing through the open shutter, into an electrical signal (analog image data) (step S302).

Next, the MPU 201 performs image processing such as development and encoding on the electrical signal obtained by the image pickup process (step S303). As a result, the image data is generated.

Next, the MPU 201 generates metadata including attribute information (camera operator, shooting time, shooting location, model of the shooting device, setting values at the time of shooting, and the like) at the time the image pickup process was executed for generating the image data (step S304).

Next, the MPU 201 generates an image file in a JPEG format, an MPEG format, or the like in which the metadata is attached to the image data (step S305).

Next, the MPU 201 controls the hash value generation unit 210 to execute the hash function on binary data of the generated image file, thereby generating a hash value (step S306).

In generation (calculation) of the hash value, the hash value may be generated with parts of the binary data of the image file being skipped. In this case, the MPU 201 generates a hash-value-calculation detailed information that records how the binary data of the image file was skipped (the way to thin out) (step S307).

Next, the MPU 201 controls the communication unit 211 to transmit the hash value and the image file to the management system 101 (step S308). At this time, the hash-value-calculation detailed information is also transmitted to the management system 101, if the hash-value-calculation detailed information is generated in step S307. It should be noted that the data transmitted in step S308 may be subjected to encryption processing. Further, the MPU 201 causes the image display unit 207 to display a warning notification (step S309). This warning notification is displayed on the image display unit 207, for example, until the MPU 201 (the image pickup apparatus 102) receives the registration completion notification from the management system 101. This warning notification is, for example, a notification cautioning a user not to insert or remove the storage medium 209 until the registration into the blockchain is completed. As a result, it is possible to prevent a process of registering the image file information in the blockchain or a process of adding the registration-completed information to the image file, which will be described later, from failing due to the insertion or removal of the storage medium 209.

Next, the MPU 201 stores the image file in the storage medium 209 (step S310), and ends the present process.

In this manner, in the present embodiment, when the image pickup apparatus 102 performs the shooting process (image capturing of a subject), not only the image file including the image data and the metadata is recorded in the storage medium 209, but also the image file and the hash value thereof are transmitted to the management system 101. Further, the hash-value-calculation detailed information is also transmitted to the management system 101, if the hash-value-calculation detailed information is generated in step S307.

Figure 4:
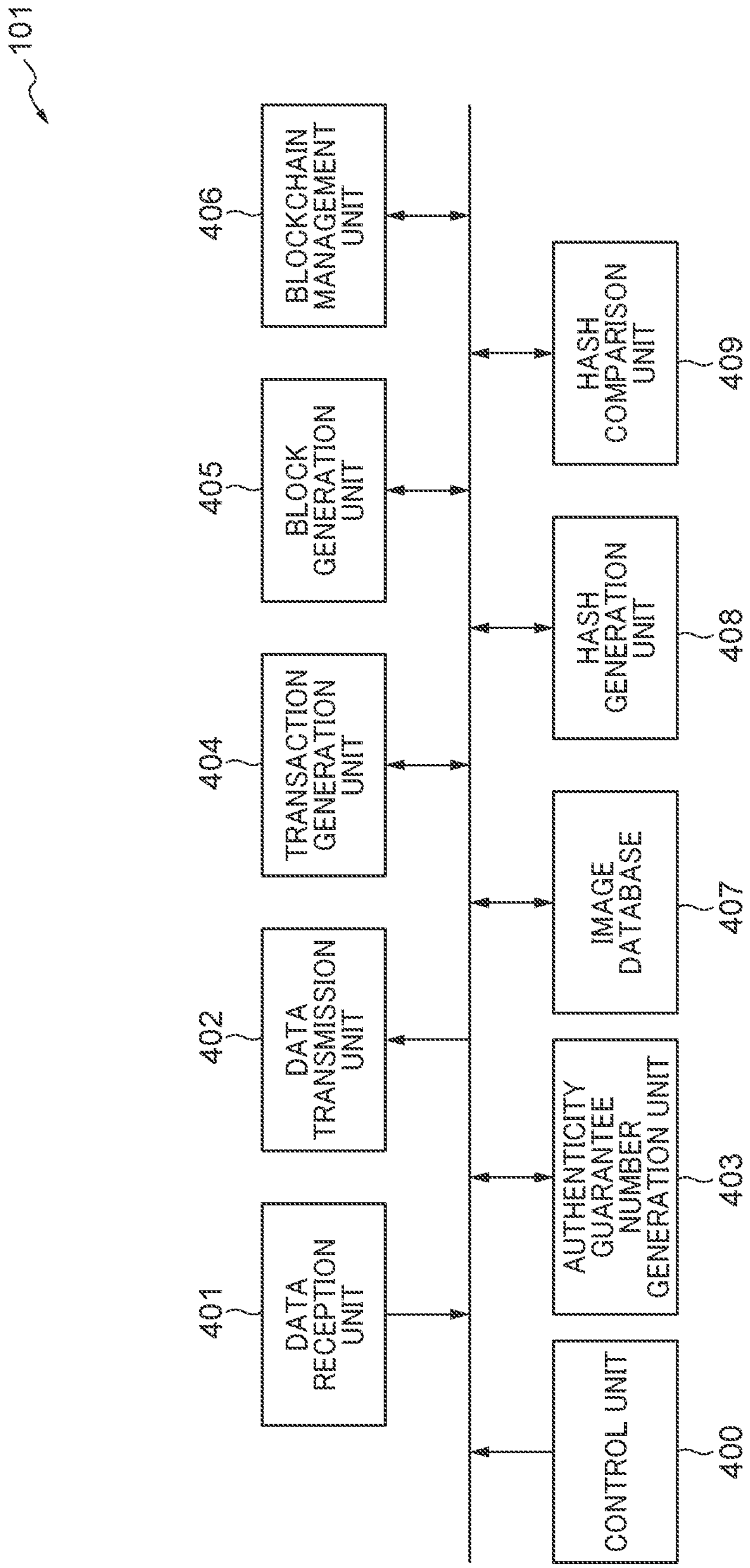
FIG. 4 is a block diagram schematically illustrating a configuration of the management system in FIG. 1.

FIG. 4 is a block diagram schematically illustrating a configuration of the management system 101 in FIG. 1. In the present embodiment, the management system 101 includes one or a plurality of computers connected to a network.

In FIG. 4, the management system 101 includes a control unit 400, a data reception unit 401, a data transmission unit 402, an authenticity guarantee number generation unit 403, and a transaction generation unit 404. Furthermore, the management system 101 includes a block generation unit 405, a blockchain management unit 406, the image database 407, a hash generation unit 408, and a hash comparison unit 409.

The control unit 400 controls the entire management system 101.

The data reception unit 401 receives various data from an external device. For example, the data reception unit 401 receives a hash value, hash-value-calculation detailed information, and an image file from the image pickup apparatus 102. Furthermore, the data reception unit 401 receives an image file and an authenticity guarantee number for determining authenticity from the communication device 105*b* operated by a viewer of the image publishing website 103.

The data transmission unit 402 transmits various data to an external device. For example, the data transmission unit 402 transmits an image file selected so as to be published on the image publishing website 103 and the authenticity guarantee number corresponding thereto to the communication device 105*a* operated by a user (for example, a camera operator or an image provider). Furthermore, the data transmission unit 402 transmits an authenticity determination result to the communication device 105*b* operated by a viewer who made an authenticity confirmation request for the image file.

When receiving a hash value and an image file from the image pickup apparatus 102, the authenticity guarantee number generation unit 403 generates the authenticity guarantee number which is a unique number in the management system 101.

The transaction generation unit 404 generates transaction data and broadcasts the generated transaction data to one or more computers (nodes) participating in the blockchain peer-to-peer network 104. The transaction data includes the hash value received from the image pickup apparatus 102, the authenticity guarantee number generated when the hash value is received and associated with the hash value, and metadata included in the image file.

When the broadcasted transaction data is approved by a miner and the verification thereof is completed, the block generation unit 405 generates a block in which the transaction data is written and connects the block to the blockchain.

The blockchain management unit 406 manages a blockchain also held by one or a plurality of computers (nodes) participating in the blockchain peer-to-peer network 104. Furthermore, the management system 101 and the nodes are synchronized with each other so that the blockchain held by each of them always has the same contents.

Image files and authenticity guarantee numbers corresponding to the respective image files are registered in the image database 407. Specifically, as illustrated in FIG. 5, the image database 407 is made up of block ID 501, authenticity guarantee number 502, and image file name 503 associated with each other.

On the block ID 501, a block ID (an ID number) sequentially issued every time a block in which transaction data including image file information is written is connected to a blockchain is set. That is, each block ID set on the block ID 501 corresponds to one of the hash values registered in the blockchain.

On the authenticity guarantee number 502, the authenticity guarantee numbers corresponding to the respective image files are set.

On the image file name 503, file names of the image files received by the management system 101 from the image pickup apparatus 102 or the like are set.

It should be noted that the configuration of the image database 407 is not limited to the above-described configuration, and the image database 407 may include other items.

Referring back to FIG. 4, when the authenticity is determined, the hash generation unit 408 generates a hash value by executing the hash function on an image file transmitted from the communication device 105*b* of a user (viewer) who made an authenticity confirmation request.

The hash comparison unit 409 acquires a block (which will be described later) corresponding to the authenticity guarantee number transmitted from the user who made the authenticity confirmation request from the blockchain managed by the blockchain management unit 406. Then, the hash comparison unit 409 acquires the hash value (the image hash value) written in the block in the blockchain. The hash comparison unit 409 compares the hash value acquired from the block with the hash value generated by the hash generation unit 408, thereby determining the authenticity. When these two hash values are the same, the hash comparison unit 409 determines that the image file transmitted from the user who made the authenticity confirmation request is not falsified (is genuine) from the time of generation thereof. On the other hand, when the two hash values are different from each other, the hash comparison unit 409 determines that the image file transmitted from the user who made the authenticity confirmation request is falsified (not genuine/false) from the time of generation thereof.

For example, there is a case in which an image file distributed from the image publishing website 103 to the communication device 105*b* has been falsified, and the falsified image file is transmitted to the management system 101 together with the authenticity confirmation request. When such an authenticity confirmation request is issued in this situation, the hash value generated by the hash generation unit 408 executing the hash function on the image file is different from the hash value generated from the image file before falsification. In the management system 101, the hash value stored in the blockchain is impossible to be changed by anyone. Therefore, when the authenticity confirmation request is issued, the hash value generated for the image file by the hash generation unit 408 does not match the hash value stored in the block in the blockchain, corresponding to the authenticity guarantee number of the authenticity confirmation request.

Figure 6:
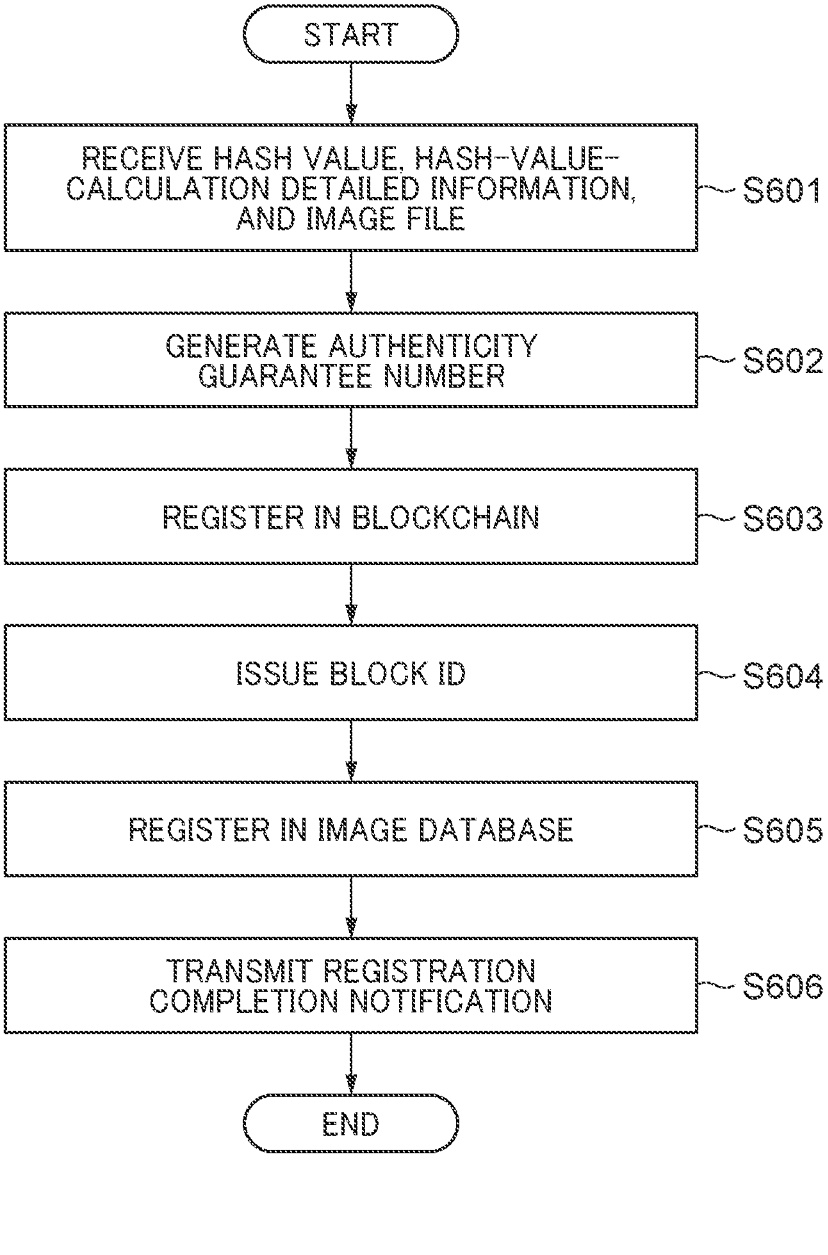
FIG. 6 is a flowchart illustrating the steps of a blockchain registration process executed in the management system in FIG. 1.

FIG. 6 is a flowchart illustrating the steps of a blockchain registration process executed in the management system 101 in FIG. 1. The blockchain registration process in FIG. 6 is implemented by the control unit 400 executing a program stored in a storage medium included in a computer constituting the management system 101. The blockchain registration process in FIG. 6 is executed, for example, when the data transmission process in FIG. 3 is performed by the image pickup apparatus 102 and the hash value and the image file are transmitted from the image pickup apparatus 102 by the process in step S308. Here, a description will be given as to a case in which the hash-value-calculation detailed information is generated in step S307 and the hash-value-calculation detailed information is also transmitted to the management system 101 together with the hash value and the image file in step S308.

In FIG. 6, the control unit 400 receives a hash value, hash-value-calculation detailed information, and an image file from the image pickup apparatus 102 (step S601). When encryption processing was performed on the received data, the control unit 400 performs decryption processing on the received data. Thereafter, the control unit 400 stores image file information, such as the hash value, the hash-value-calculation detailed information, and metadata included in the received image file, in the RAM (which is not illustrated).

Next, the control unit 400 controls the authenticity guarantee number generation unit 403 to generate the authenticity guarantee number for the received image file (step S602).

Next, the control unit 400 registers, in the blockchain, the authenticity guarantee number generated in step S602 and the image file information, such as the hash value, the hash-value-calculation detailed information, and the metadata stored in the RAM in step S601 (step S603). Specifically, the control unit 400 first controls the transaction generation unit 404 to generate transaction data including the authenticity guarantee number, the hash value, the hash-value-calculation detailed information, and the metadata. Next, the control unit 400 controls the transaction generation unit 404 to broadcast the transaction data to one or more computers (nodes) participating in the blockchain peer-to-peer network 104. When the broadcasted transaction data is approved by a miner and the verification thereof is completed, the block generation unit 405 generates a block in which the verified transaction data is written and connects (registers) the block to the blockchain.

Next, the control unit 400 issues a block ID corresponding to the block (step S604). Here, the control unit 400 issues a value generated by executing the hash function on the header of the block twice as the block ID. It should be noted that the block ID is used to refer to the block, but there is no field of the block ID in the block.

Next, the control unit 400 registers, in the image database 407, the issued block ID, the image file received in step S601, and the authenticity guarantee number generated in step S602 in association with each other (step S605). Next, the control unit 400 transmits, to the image pickup apparatus 102, a registration completion notification indicating that the process of registering the image file information in the blockchain is completed (step S606). Thereafter, the blockchain registration process ends.

Figure 7:
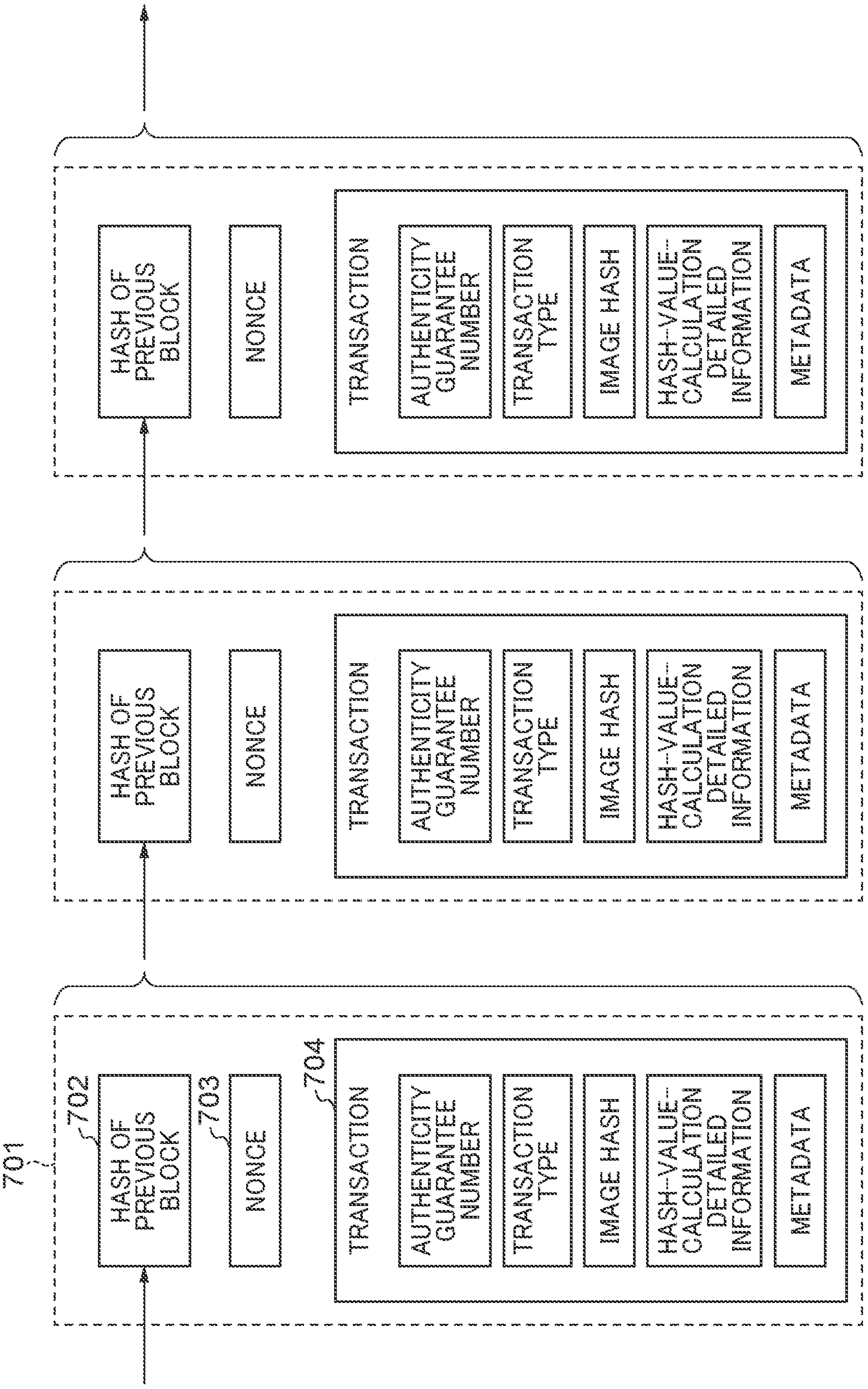
FIG. 7 is a diagram illustrating an example of a block data structure of a blockchain managed by a blockchain management unit in FIG. 4.

FIG. 7 is a diagram illustrating an example of a block data structure of the blockchain managed by the blockchain management unit 406 in FIG. 4. As illustrated in FIG. 7, a blockchain is a database formed by connecting blocks to each other along a time series like a chain. A block 701 connected to a blockchain includes a hash 702 of the previous block, a nonce 703, and a transaction 704.

The hash 702 of the previous block is a hash value of a block connected to a blockchain one block before the block 701.

The nonce 703 is a nonce value used for mining.

The transaction 704 is transaction data generated by the transaction generation unit 404, and includes a transaction type, an image hash, an authenticity guarantee number, hash-value-calculation detailed information, and metadata.

The transaction type is information indicating the type of transaction. An internal structure of a transaction varies depending on the transaction type.

The image hash is a hash value transmitted from the image pickup apparatus 102 to the management system 101.

The authenticity guarantee number is an authenticity guarantee number generated by the management system 101 when the image hash is transmitted from the image pickup apparatus 102 to the management system 101.

The hash-value-calculation detailed information is hash-value-calculation detailed information transmitted from the image pickup apparatus 102 to the management system 101.

The metadata is metadata included in the image file transmitted from the image pickup apparatus 102 to the management system 101.

Figure 8:
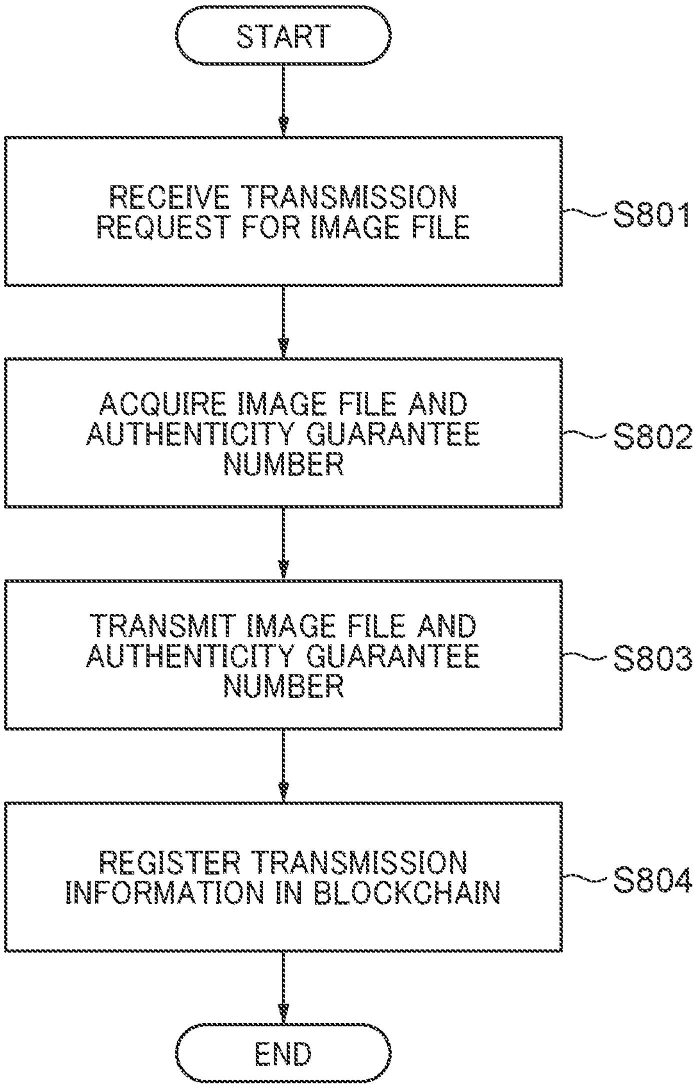
FIG. 8 is a flowchart illustrating the steps of a process of transmitting an image file to an image publishing website, executed by the management system in FIG. 1.

FIG. 8 is a flowchart illustrating the steps of a process of transmitting an image file to the image publishing website 103 executed by the management system 101 in FIG. 1. The image file transmission process in FIG. 8 is also implemented by the control unit 400 executing a program stored in a storage medium included in the computer constituting the management system 101. The image file transmission process in FIG. 8 is executed, for example, when a user (for example, a camera operator) selects one of image files registered in the image database 407 using the communication device 105*a* and makes a transmission request for the image file to the image publishing website 103. The transmission request includes the block ID, which is associated in the image database 407 with the image file selected by the user.

In FIG. 8, first, the control unit 400 causes the data reception unit 401 to receive the transmission request from the communication device 105*a* operated by the user (step S801).

Next, the control unit 400 acquires the image file, which is a target of the transmission request, and the authenticity guarantee number of the image file from the image database 407 (step S802). Specifically, the image file and the authenticity guarantee number corresponding to the block ID included in the transmission request are acquired from the image database 407.

Next, the control unit 400 causes the data transmission unit 402 to transmit the acquired image file and authenticity guarantee number to the image publishing website 103 (step S803). At the same time, the control unit 400 notifies the communication device 105*a* of the user, who is a request sender of the transmission request, that the image file, which is the target of the transmission request, is now ready for publication on the image publishing website 103.

Next, the control unit 400 registers transmission information of the image file in the blockchain (step S804). Specifically, the control unit 400 first causes the transaction generation unit 404 to generate transaction data including the authenticity guarantee number and the information (such as URL) indicating the transmission destination of the transmission information of the image file, the image data, and the authenticity guarantee number. Next, the control units 400 causes the transaction generation unit 404 to broadcast the transaction data to one or more computers (nodes) participating in the blockchain peer-to-peer network 104. When the broadcasted transaction data is approved by a miner and the verification thereof is completed, the block generation unit 405 generates a block in which the verified transaction data is written and connects the block to the blockchain. Thereafter, the image file transmission process ends.

As described above, in the image file transmission process in FIG. 8, when an image file is transmitted from the management system 101 to the image publishing website 103 in response to a transmission request from a user, the management system 101 notifies the user that the image file is now ready for publication on the image publishing website 103. At the same time, transmission information of the image file is registered in a blockchain. Therefore, the user can grasp the usage status of the image file.

Figure 9:
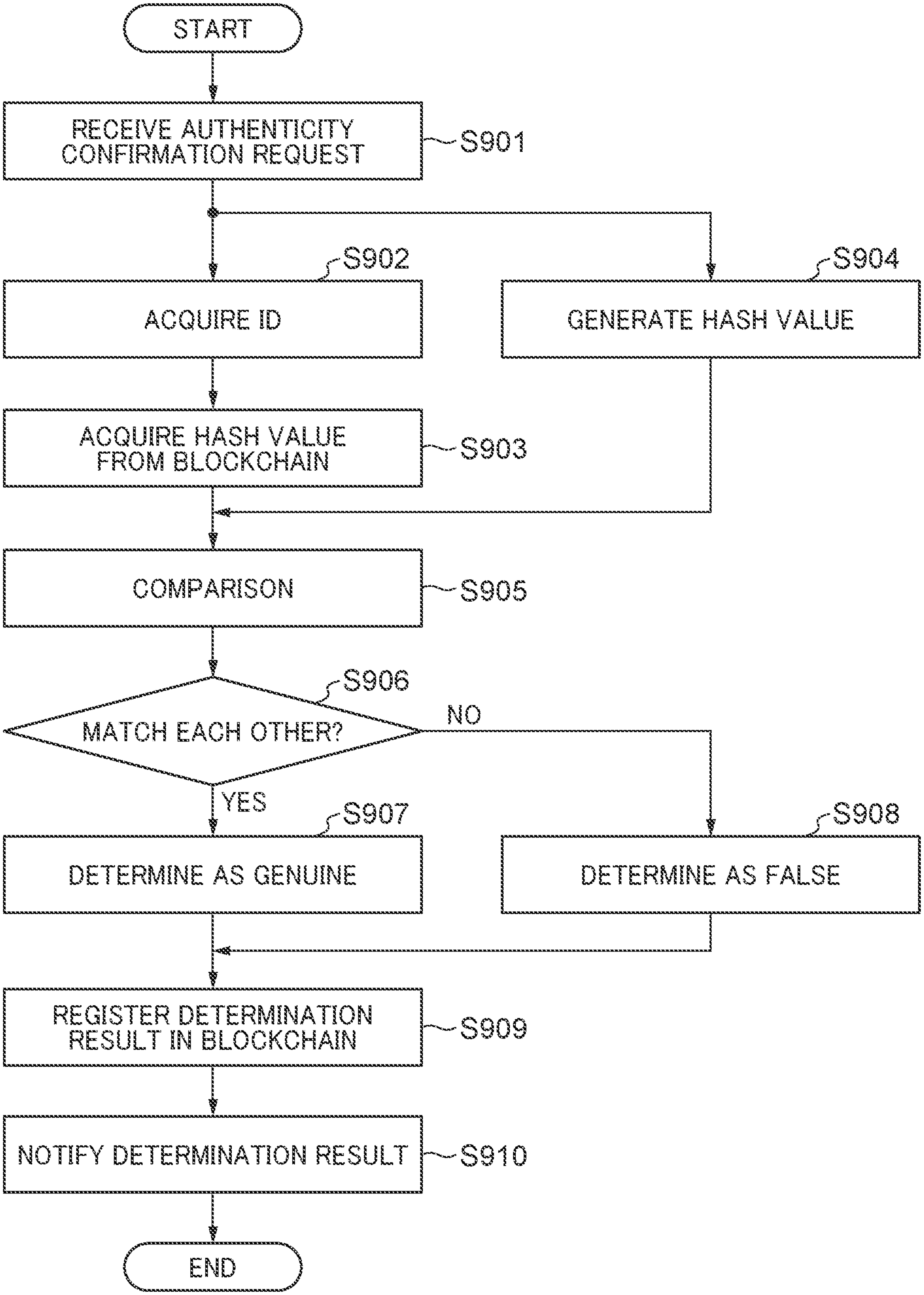
FIG. 9 is a flowchart illustrating the steps of an authenticity determination process executed in the management system in FIG. 1.

FIG. 9 is a flowchart illustrating the steps of an authenticity determination process executed in the management system 101 in FIG. 1. The authenticity determination process in FIG. 9 is also implemented by the control unit 400 executing a program stored in a storage medium included in the computer constituting the management system 101. Here, the authenticity determination process in FIG. 9 is executed when a viewer of the image publishing website 103 operates the communication device 105*b* and makes an authenticity confirmation request for an image file displayed on the image publishing website 103 to the management system 101, but the present invention is not limited thereto.

In FIG. 9, the control unit 400 causes the data reception unit 401 to receive the authenticity confirmation request from the communication device 105*b* operated by the viewer (step S901). At this time, the control unit 400 also receives the image file, which is a target of the authenticity determination, and the authenticity guarantee number corresponding to the image file by the data reception unit 401.

Next, the control unit 400 makes an inquiry to the image database 407 using the authenticity guarantee number received in step S901 as a key, and acquires a block ID corresponding to the authenticity guarantee number (step S902).

Next, the control unit 400 accesses a block in the blockchain, corresponding to the acquired block ID, and acquires a hash value (an image hash value) stored in the block (step S903).

Further, in parallel with the processes in steps S902 and S903, the control unit 400 causes the hash generation unit 408 to execute the hash function on the image file received in step S901 (step S904). As a result, the control unit 400 causes the hash generation unit 408 to generate (acquire) a hash value. At this time, the block corresponding to the acquired block ID among a plurality of blocks constituting the blockchain is accessed, and the hash-value-calculation detailed information stored in the block is acquired. In step S904, the hash value is generated with reference to the hash-value-calculation detailed information.

When the processes in steps S902 to S904 are completed, the control unit 400 causes the hash comparison unit 409 to compare the image hash value acquired in step S903 with the hash value generated in step S904 (step S905).

The control unit 400 determines whether the two hash values compared in step S905 match each other (step S906).

When the two hash values match each other as a result of the determination in step S906, the control unit 400 determines that the image file received in step S901 is “genuine” indicating that the image file has not been falsified since the generation thereof (step S907). Thereafter, the processing proceeds to step S909.

On the other hand, as a result of the determination in step S906, when the two hash values do not match each other, the control unit 400 determines that the image file received in step S901 is “false” indicating that the image file has been falsified since generation thereof (step S908), and the processing proceeds to step S909.

Next, the control unit 400 controls the block generation unit 405 to register the determination result in step S907 or step S908 in the blockchain (step S909). Specifically, the block generation unit 405 generates a block in which the determination result in step S907 or S908 is written, and connects the block to the blockchain.

Next, the control unit 400 controls the data transmission unit 402 to notify the communication device 105*b*, which is the request sender of the authenticity confirmation request, of the determination result (step S910), and ends the present processing.

As described above, according to the present embodiment, the following processes are executed in the management system 101. First, in response to receipt of an image file and a hash value at the time of generation thereof, an authenticity guarantee number for identifying the received image file is generated, and the received hash value is registered in a blockchain in association with the authenticity guarantee number. Thereafter, in response to an authenticity confirmation request from a viewer, the hash value generated from the image file received together with the authenticity confirmation request is compared with the hash value in the blockchain, corresponding to the authenticity guarantee number received together with the authenticity confirmation request. As a result, the management system 101 can easily determine the authenticity of the image file acquired by the viewer.

In the present embodiment, the image file received by the management system 101 together with the hash value from the image pickup apparatus 102 includes still image data or video data. That is, in the present embodiment, the authenticity of still image data and video data registered in management system 101 can be easily determined. Further, when executing the hash function on the image file, the image pickup apparatus 102 thins out image data included in the image file (for example, if the image data is the video data, the hash function is executed every other frame), so that the calculation load is reduced. Furthermore, since the information on the thinning out is also associated with the blockchain as the hash-value-calculation detailed information and is not changed, the accuracy of determination when the authenticity determination process is executed on the image file is enhanced.

In the present embodiment, according to a transmission request for an image file received from a user, the image file corresponding to the hash value registered in the blockchain and the authenticity guarantee number displayed together with the image file and registered in the blockchain in association with the hash value are transmitted. As a result, when making an authenticity confirmation request for this image file, the user can transmit the image file and the authenticity guarantee number of the image data to the management system 101. As a result, the authenticity of the image file can be easily determined.

In the present embodiment, the management system 101 includes the hash generation unit 408. As a result, a user making an authenticity confirmation request is not requested to generate a hash value for an image file, and it is possible to use the image file transmitted from the user to determine the authenticity of the image file.

In the present embodiment, the management system 101 includes at least a first computer that generates the authenticity guarantee number of an image file and a second computer that registers a hash value at the time of generating the image file in a blockchain in association with the authenticity guarantee number. As a result, the authenticity of an image file can be easily determined in a configuration such that generation of the authenticity guarantee number of the image file and registration in a blockchain are performed by different computers.

Furthermore, in the present embodiment, the management system 101 includes at least a plurality of computers that registers a hash value at the time of generating an image file in a blockchain in association with the authenticity guarantee number. As a result, the authenticity of an image file can be easily determined in a configuration such that registration in a blockchain is performed by a plurality of computers.

Here, the storage medium 209 of the image pickup apparatus 102 stores a plurality of image files generated by the image pickup apparatus 102 performing shooting processes. The plurality of image files also includes an image file, the information of which has been registered in a blockchain by the above-described processes. A user (the camera operator) confirms image files on the image display unit 207 of the image pickup apparatus 102, and organizes the image files stored in the storage medium 209, for example, by addition to or removal from favorites. However, in the related art, the image display unit 207 of the image pickup apparatus 102 does not indicate information of which image file has been registered in a blockchain, and thus it is not easy to organize the image files.

On the other hand, in the present embodiment, in response to the state in which the image pickup apparatus 102 receives a registration completion notification indicating that a process of registering image file information in a blockchain is completed, registration-completed information indicating that the image file information is registered in the blockchain is added to the image file.

Figure 10:
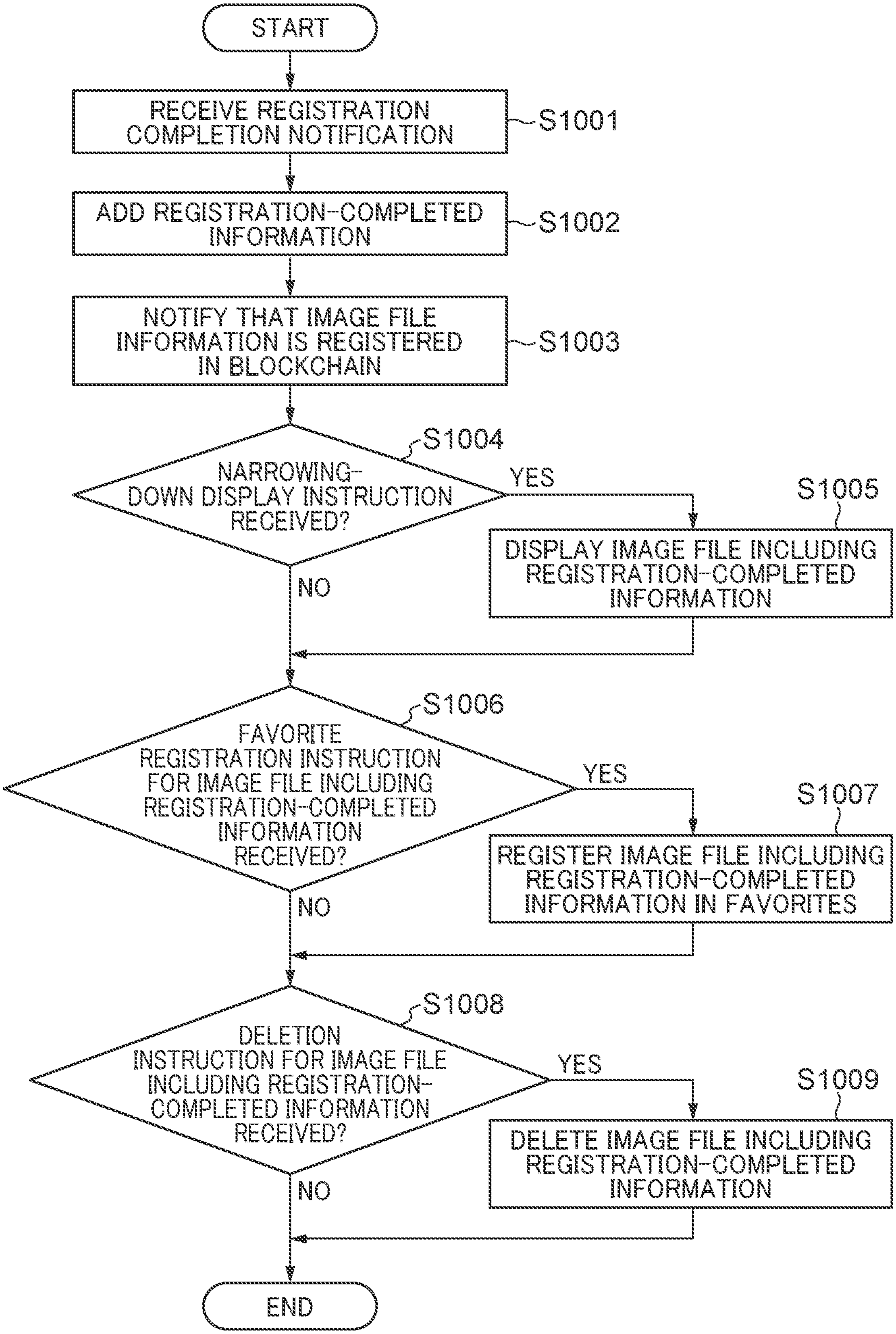
FIG. 10 is a flowchart illustrating the steps of a registration-completed information adding process executed in the image pickup apparatus in FIG. 1.

FIG. 10 is a flowchart illustrating the steps of a registration-completed information adding process executed in the image pickup apparatus 102 in FIG. 1. The registration-completed information adding process in FIG. 10 is implemented by the MPU 201 of the image pickup apparatus 102 executing a program stored in the storage medium 209 or the like. The registration-completed information adding process in FIG. 10 is executed when the management system 101 completes a process of registering image file information in a blockchain.

In FIG. 10, first, the MPU 201 receives the registration completion notification from the management system 101 (step S1001). Next, the MPU 201 adds registration-completed information to the image file (step S1002). Specifically, the MPU 201 adds the registration-completed information to the metadata included in the image file. The registration-completed information is information indicating that image file information is registered in a blockchain. As a result, registration-completed information is stored so as to relate to the file image. Next, the MPU 201 notifies a user that the image file information is registered in the blockchain (step S1003). Specifically, the MPU 201 causes the image display unit 207 to display a guidance for notifying that the image file information is registered in the blockchain. Next, the MPU 201 determines whether a narrowing-down display instruction is received (step S1004).

When it is determined in step S1004 that the narrowing-down display instruction is received, the MPU 201 causes the image display unit 207 to display the image file including the metadata to which the registration-completed information is added among the image files stored in the storage medium 209 (step S1005). It should be noted that, hereinafter, an image file including metadata to which the registration-completed information is added is referred to as an "image file including the registration-completed information". Thereafter, the processing proceeds to step S1006.

When it is determined in step S1004 that the narrowing-down display instruction is not received, the MPU 201 determines whether a favorite registration instruction for the image file including the registration-completed information is received (step S1006).

When it is determined in step S1006 that the favorite registration instruction for the image file including the registration-completed information is received, the MPU 201 registers the image file including the registration-completed information among the image files stored in the storage medium 209 in the favorites (step S1007). Thereafter, the processing proceeds to step S1008.

When it is determined in step S1006 that the favorite registration instruction for the image file including the registration-completed information is not received, the MPU 201 determines whether a deletion instruction for the image file including the registration-completed information is received (step S1008).

When it is determined in step S1008 that the deletion instruction for the image file including the registration-completed information is not received, the processing ends. When it is determined in step S1008 that the deletion instruction for the image file including the registration-completed information is received, the MPU 201 deletes the image file including the registration-completed information from the storage medium 209 (step S1009). Thereafter, this processing ends.

According to the present embodiment, a hash value of an image file is generated immediately after the image file is generated, and image file information including the hash value is transmitted to the management system 101. In response to the state in which the image pickup apparatus 102 receives a registration completion notification indicating that a process of registering the image file information in a blockchain is completed, the registration-completed information is added to the image file or stored so as to relate to the file image. As a result, it is possible to easily confirm an image file, the information of which has been registered in a blockchain.

Further, in the present embodiment, an image file includes image data obtained by performing image capturing of a subject. As a result, it is possible to easily confirm an image data, the information of which has been registered in a blockchain.

Further, in the present embodiment, an image data is still image data or video data. As a result, it is possible to easily confirm still image data and the video data, the information of which has been registered in a blockchain.

In the present embodiment, in accordance with a narrowing-down display instruction from a user, an image file including the registration-completed information among a plurality of image files stored in the storage medium 209 is displayed on the image display unit 207. As a result, the user can easily grasp the image file, the information of which has been registered in the blockchain.

Further, in the present embodiment, in accordance with a favorite registration instruction from a user for an image file including the registration-completed information, the image file including the registration-completed information in the image files stored in the storage medium 209 is registered in the favorites. As a result, the image file, the information of which has been registered in a blockchain, can be easily registered in the favorites.

Further, in the present embodiment, in accordance with a deletion instruction from a user for an image file including the registration-completed information, the image file including the registration-completed information is deleted from the storage medium 209. As a result, the image file, the information of which has been registered in a blockchain, can be easily deleted from the storage medium 209.

It should be noted that, in step S1002 described above, for example, in a case where registration-completed information failed to be added to (or failed to be stored so as to relates to) an image file because of, for example, removal of the storage medium 209 from the image pickup apparatus 102, a notification of a cause of the failure may be given to a user. As a result, a user can easily grasp the cause of the failure, and can immediately take measures such that addition or storing of the registration-completed information can be successfully performed.

It should be noted that, in the above-described embodiments, the configuration in which the image pickup apparatus 102 adds or relates the registration-completed information to an image file is described, but the present invention is not limited to this configuration. For example, the management system 101 may be configured to add the registration-completed information to an image file acquired from the image pickup apparatus 102, and to transmit the image file to which the registration-completed information is added to the image pickup apparatus 102. Even in such a configuration, the same effects as those of the above-described embodiments can be obtained.

Furthermore, in the above-described embodiments, video data may be data of only audio data. As a result, it is possible to easily confirm audio data, the information of which has been registered in a blockchain.

Further, in the above-described embodiments, an image file including the registration-completed information may be displayed on the image display unit 207 so as to be distinguishable from an image file to which the registration-completed information is not added or related. For example, in such display, a predetermined mark or the like is indicated in the vicinity of an image file including the registration-completed information, which indicates that information on the image file is registered in a blockchain. On the other hand, the predetermined mark or the like is not displayed in the vicinity of an image file to which the registration-completed information is not added or related. By performing such display control, a user can easily grasp an image file, the information of which has been registered in a blockchain.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The invention claimed is:

1. A content generation apparatus comprising:

a display;

a memory storing instructions; and at least one processor that executes the instructions to:

generate content data;

calculate a hash value of the content data in response to generating the content data;

transmit content information including the hash value to a management server that registers the content information in a blockchain;

receive a notification indicating that a process of registering the content information in the blockchain is completed; and store, in the content data, registration-completed information indicating that the content information is registered in the blockchain, relating to the content data in response to receipt of the notification, wherein the content data to which the registration-completed information is related are stored in a storage device, wherein the storage device is configured to be insertable into and removable from the content generation apparatus, and the at least one processor executes the instructions to, during a period from transmission of the content information to receipt of the notification, cause the display to display a notification cautioning not to insert or remove the storage device.

2. The content generation apparatus according to claim 1, further comprising an image capturing unit configured to perform image capturing a subject, wherein the content data includes image data obtained by the image capturing unit performing image capturing the subject.

3. The content generation apparatus according to claim 2, wherein the image data is still image data or video data.

4. The content generation apparatus according to claim 3, wherein the video data is data including audio data.

5. The content generation apparatus according to claim 1, wherein the at least one processor executes the instructions to cause the display to display the content data to which the registration-completed information is related so as to be distinguishable from the content data to which the registration-completed information is not related.

6. The content generation apparatus according to claim 5, wherein multiple pieces of content data including the content data to which the registration-completed information is related are stored in the storage device, and the at least one processor executes the instructions to cause the display to display the content data to which the registration-completed information is related among the multiple pieces of content data, in accordance with an instruction from a user.

7. The content generation apparatus according to claim 6, wherein the at least one processor executes the instructions to register the content data to which the registration-completed information is related among the multiple pieces of content data in favorites in accordance with a second instruction from the user.

8. The content generation apparatus according to claim 6, wherein the at least one processor executes the instructions to delete the content data to which the registration-completed information is related from the storage device in accordance with a third instruction from the user.

9. The content generation apparatus according to claim 1, wherein, the at least one processor executes the instructions to, in a case of failure to store the registration-completed information relating to the content data, give a user a notification of a cause of the failure.

10. A control method for a content generation apparatus having a display, the control method comprising:

generating content data;

calculating a hash value of the content data in response to generating the content data;

transmitting content information including the hash value to a management server that registers the content information in a blockchain;

receiving a notification indicating that a process of registering the content information in the blockchain is completed; and storing, in the content data, registration-completed information indicating that the content information is registered in the blockchain, relating to the content data in response to receipt of the notification, wherein the content data to which the registration-completed information is related are stored in a storage device, wherein the storage device is configured to be insertable into and removable from the content generation apparatus, and during a period from transmission of the content information to receipt of the notification, causing a notification cautioning not to insert or remove the storage device to be displayed on the display.

11. A non-transitory computer-readable storage medium storing a program for causing a computer to execute a control method for a content generation apparatus having a display, the control method comprising:

generating content data;

calculating a hash value of the content data in response to generating the content data;

transmitting content information including the hash value to a management server that registers the content information in a blockchain;

receiving a notification indicating that a process of registering the content information in the blockchain is completed; and storing, in the content data, registration-completed information indicating that the content information is registered in the blockchain, relating to the content data in response to receipt of the notification, wherein the content data to which the registration-completed information is related are stored in a storage device, wherein the storage device is configured to be insertable into and removable from the content generation apparatus, and during a period from transmission of the content information to receipt of the notification, causing a notification cautioning not to insert or remove the storage device to be displayed on the display.

* * * * *